United States Patent
Venigalla

(10) Patent No.: US 10,305,849 B2
(45) Date of Patent: May 28, 2019

(54) GROUP WISH SYSTEM AND METHOD

(71) Applicant: Prasad Venigalla, Glen Head, NY (US)

(72) Inventor: Prasad Venigalla, Glen Head, NY (US)

( * ) Notice: Subject to any disclaimer, the term of this patent is extended or adjusted under 35 U.S.C. 154(b) by 0 days.

(21) Appl. No.: 15/274,659

(22) Filed: Sep. 23, 2016

(65) Prior Publication Data

US 2017/0085517 A1    Mar. 23, 2017

Related U.S. Application Data

(60) Provisional application No. 62/222,576, filed on Sep. 23, 2015.

(51) Int. Cl.
*H04L 12/28* (2006.01)
*G06F 15/16* (2006.01)
*H04L 12/58* (2006.01)

(52) U.S. Cl.
CPC ............. *H04L 51/32* (2013.01); *H04L 51/10* (2013.01)

(58) Field of Classification Search
CPC ....... G06Q 30/02; G06Q 10/107; H04L 51/32
USPC ...... 709/205, 206, 217, 224; 705/26.1, 26.8, 705/27.1
See application file for complete search history.

(56) References Cited

U.S. PATENT DOCUMENTS 9,159,091 B2 * 10/2015 Horvitz ............. G06Q 30/0631
2015/0120491 A1 * 4/2015 Bisht ................. G06F 17/30873
705/26.5

OTHER PUBLICATIONS

"Social Visibility and the Gifting of Digital Goods"—Watts et al, Univ. of Arizona, Apr. 2015 https://mis.eller.arizona.edu/sites/mis/files/documents/speakers-series/2015/yotam_shmargad_digital_gifts.pdf.*

* cited by examiner

*Primary Examiner* — Randy Scott
(74) *Attorney, Agent, or Firm* — CoffyLaw, LLC; Emmanuel Coffy, Esq.

(57) ABSTRACT

A system and method for a social networking greeting card are disclosed. In various embodiments, a group wish system for group of friends or family (initiator/host) to are greeting card or express and communicate wishes (emotional, feelings) in commemoration of birthdays, anniversaries, holidays, weddings, reunions, demands, protests, opinion surveys, statistical purposes, complaints or any celebration to one or more individuals. The system can be used by officials, relatives and may be used as a marketing tool. Wishes from sponsors are added to the greeting card at the beginning, middle or end of the card. For example, a college or university can provide sponsorship messages to the added to the card.

20 Claims, 4 Drawing Sheets

200

GROUP WISH SYSTEM AND METHOD

This application claims the benefit to U.S. Provisional Application No. 62/222 576, filed on Sep. 23, 2015, which application is incorporated herein by reference as set forth in its entirety.

FIELD OF THE INVENTION

The present invention relates generally to the field of social networking, and more particular to system and method for social greeting.

BACKGROUND OF THE INVENTION

Social networks allow a user to create a page to post pictures, stories, events, news, questions, answers, documents and the like. The user would invite friends or followers to view and/or respond to these postings. These systems, however, do not provide a method for a user to initiate an individual or group related greetings. For example, a person celebrating his/her birthday may receive greetings in the form of cards in the mail, email, social media notifications as different times. Responding to each form of greeting is a time consuming effort.

SUMMARY OF THE INVENTION

Various embodiments provide a system and method for group wish or individual greeting for a personal event such as birthdays, anniversaries, holidays, promotions, weddings, class, family reunions and the like. Moreover, the present embodiments enable combined greeting from a plurality of people at once and a thank you video response will be dispatched to all at once in a coordinated manner. A personal touch for the recipient is added in the form of sponsor and celebrity, which is unique for the recipient.

In one embodiment, a computer-implemented method is provided. The method comprises the steps of accessing a group wish social networking system associated with a plurality of users including an initiator, one or more recipients and a plurality of friends; triggering by the initiator a notification embedded with a link to a plurality of host based templates associated with a specific occasion connected with the one or more respective recipients; selecting a subset of templates to present to a chosen subset of the plurality of friends, the selected subset of templates containing background music and transitions to thereby build one or more custom templates each having a unique ID and a plurality or corresponding slots associated with each template thereby constituting a group message proportionate to the number of friends selected; propagating toward the plurality of selected friends the group message with a corresponding time-stamp, the group message containing the one or more custom templates and instruction directing the plurality of selected friends to choose a threshold number of custom templates; receiving, by a processor, the one or more custom templates having received a highest number of votes; and notifying the initiator once a specific condition is fulfilled.

Another embodiment provides a system, which includes at least one computing device communicatively coupled to at least one apparatus; a non-transitory computer readable medium having stored thereon instructions that, upon execution by the at least one computing device, cause the computing device to perform the steps comprising: accessing a group wish social networking system associated with a plurality of users including an initiator, one or more recipients and a plurality of friends; triggering by the initiator a notification embedded with a link to a plurality of host based templates associated with a specific occasion connected with the one or more respective recipients; selecting a subset of templates to present to a chosen subset of the plurality of friends, the selected subset of templates containing background music and transitions to thereby build one or more custom templates each having a unique ID and a plurality of corresponding slots associated with each template thereby constituting a group message proportionate to the number of friends selected; propagating toward the plurality of selected friends the group message with a corresponding time-stamp, the group message containing the one or more custom templates and instruction. directing the plurality of selected friends to choose a threshold number of custom templates; receiving, by a processor, the one or more custom templates having received a highest number of votes; and notifying the initiator once a specific condition is fulfilled; and one or more processors communicatively coupled to the computing device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used to designate elements having substantially the same or similar structure and/or substantially the same or similar function.

DETAILED DESCRIPTION OF THE INVENTION

Various embodiments provide a system and method for friends or family (initiator/host) to share greeting card or express and communicate wishes (emotional, feelings) in commemoration of birthdays, anniversaries, holidays, weddings, reunions, demands, protests, opinion surveys, statistical complaints, complaints or any celebration to one or more individuals. The system can be used by officials, relatives and may be used as a marketing tool. Wishes from sponsors are added to the greeting card at the beginning, middle or end of the card. For example, a college or university can provide sponsorship messages to the added to the card.

The illustrative system and method embodiments described herein are not meant to be limiting. It may be readily understood that certain aspects of the disclosed system and method can be arranged and combined in a variety of different configurations, all of which are contemplated herein.

Group Wish comprises three (3) distinct groups of people namely, a host or initiator 201; one or more friends (invitees) 202 and one or more recipients 205, which make-up the universe of Group Wish's users.

In one embodiment, an exemplary computing device is configured to allow a user to access the system to begin a session. Generally, the initiator or host initiates the process by triggering a notification embedded with a link to the template based on a specific occasion. The templates are loaded onto a server equipped with built-in background music and transitions. The initiator or host invites common friends to start the process. The initiator selects the theme, types up general greetings then invites all common friends and sets the deadline to finish with process. The theme can be customized or selected from a fist of options including themes produced by artists or computer generated. Each invitee adds note, voice message, photo, video and the like. The initiator adds the final touch and then shares the "greeting card" with the recipient who then sends a thank you note to the senders.

Generally speaking, any computing device such as a cellular telephone or smart phone or any computing device having similar functionality may implement the various embodiments described herein. In various embodiments, any Internet enabled device such as personal digital assistant (PDA), laptop, desktop, electronic book, tablets and the like capable of accessing the Internet may implement the various embodiments described herein. While computing devices are generally discussed within the context of the description, the use of any device having similar functionality is considered to be within the scope of the present embodiments.

Figure 1:
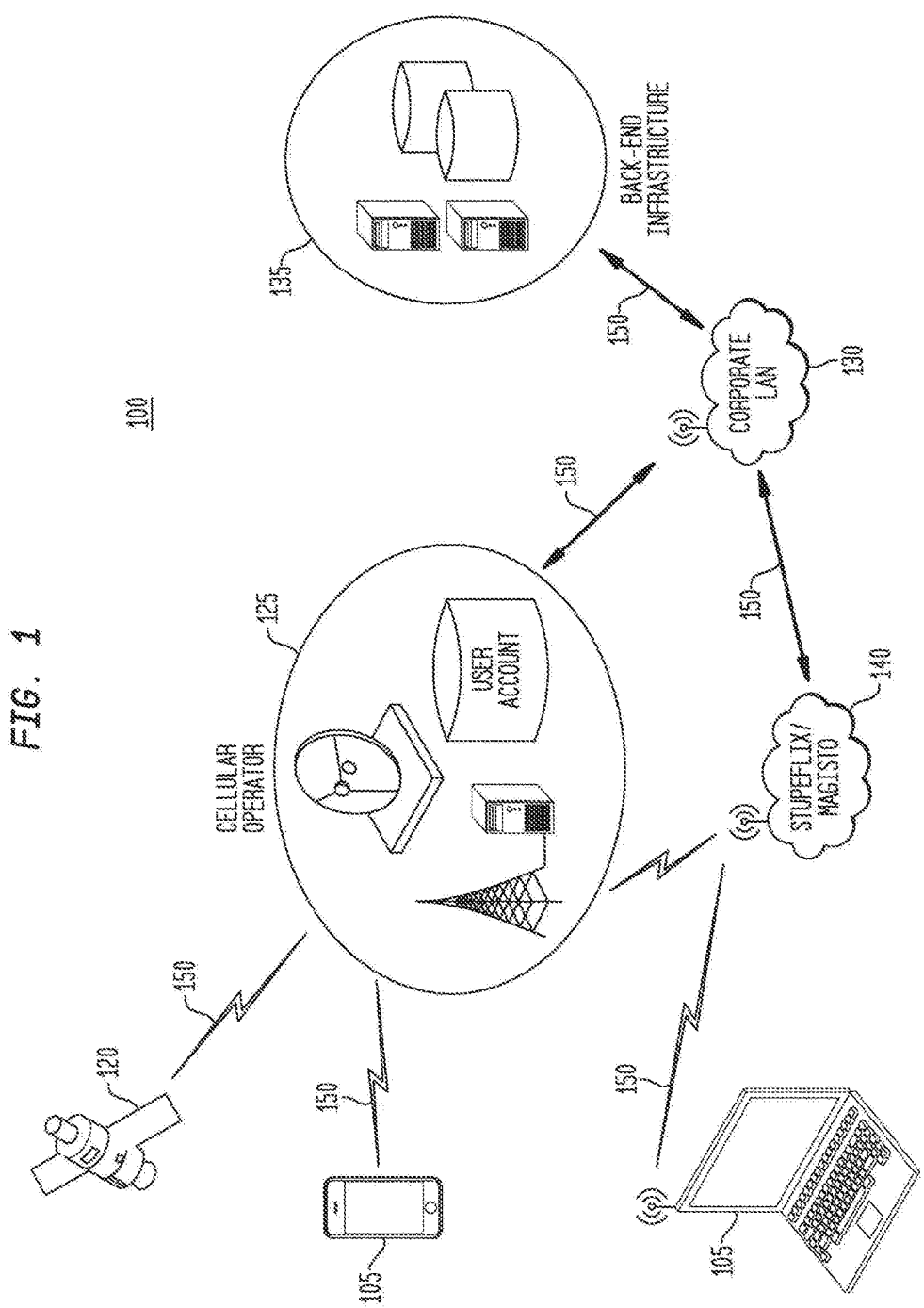
FIG. 1 depicts a high-level block diagram of a system benefiting from embodiments of the present invention.

Referring now to the figures, FIG. 1 is a simplified block diagram of a system 100, according to an exemplary embodiment herein described.

In one embodiment, the user interacts with networks 120, 125, 135, 130, 140 via link 150. In one embodiment, link 150 extends over great distance and is a cable, satellite or fiber optic link, a combination of such links or any other suitable communications path. In various embodiments, link 150 extends over a short distance. In one embodiment, link 150 is a local area network where both user interface device 115 and digital capturing device 105 reside in the same general location. In another embodiment, link 150 is a network connection between geographically distributed systems, including network connection over the Internet. In other embodiments, link 150 is wireless. In various embodiments, device 110 is a smart phone, cellular telephone, personal digital assistant (PDA), wireless hotspot or any internet-enabled device including a desktop computer, laptop computer, tablet computer) and the like capable of accessing the Internet may be used in terms of device 110.

In various embodiments, Satellite 120 is a geo-synchronous satellite system such as global positioning system (GPS). In one embodiment, satellite 120 is low earth orbit satellite system. In other embodiments, the use of any system having similar functionality is considered to be within the scope of the present embodiments.

In various embodiments, Cellular system 125 is a wireless infrastructure supporting cellular network functionality. In one embodiment, cellular system 125 is a small area wireless system. In other embodiments, cellular system 125 is a wide area wireless system. In other embodiments, cellular system 125 is a Wi-Fi system. In various embodiments, Cellular system 125 supports mobile services within an LTE network or portions thereof, those skilled in the art and informed by the teachings herein will realize that the various embodiments are also applicable to wireless resources associated with other types of wireless networks (e.g., 4G networks, 3G networks, 2G networks, WiMAX, etc.), wireline networks or combinations of wireless and wireline networks. Thus, the network elements, links, connectors, sites and other objects representing mobile services may identify network elements associated with other types of wireless and wireline networks. In other embodiments, the use of any wireless system having similar functionality is considered to be within the scope of the present embodiments.

In various embodiments, network 130 is an access network. In one embodiment, network 135 is a virtual private network (VPN). In other embodiments, network 135 is any network having similar functionality and as such is considered to be within the scope of the present embodiments.

Backend infrastructure 135 generally refers to infrastructure associated with the server or Host, a web server. In other embodiments, networking system 100 include additional, fewer, or different modules for various applications. Conventional components such as network interfaces, security functions, load balancers, failover servers, management and network operations consoles, and the like are not shown for better explanation of the details or the system.

The web server links networking system 100 via link 150 to one or more client devices 105. The web server serves web pages, as well as other web-related content, such as Java, Flash, XML, and so forth. The web server may provide the functionality of receiving and routing messages between networking system 100 and client devices 105, for example, instant messages, queued messages (e.g., email), text and SMS (short message service) messages, or messages sent using any other suitable messaging technique. The user can send a request to the web server to upload information, for example, images or videos that are embedded in a template. Additionally, the web server may provide API functionality to send data directly to native client device operating systems, such as iOS, DROID, webOS, and RIM. The Web server may also serve web pages including question and votes via the network 100 to client devices 105. Alternatively, the web server may also render question and votes in native applications on client devices 105. In one embodiment, a web server may render question on a native platform's operating system, such as iOS or ANDROID, to appear as embedded advertisements in native applications.

Network 140 may be a local area network where both user interface device 115 and computing device 105 reside in the same general location, or may be network connections between geographically distributed systems, including network connection over the Internet. User interface device 115 generally includes a central processing unit (CPU) connected by a bus to memory and storage (not shown). Each user interface device 115 is typically running an operating system (OS) configured to manage interaction between the computing device and the higher level software running on user interface device 115 as known to an artisan of ordinary skill in the art.

Figure 2:
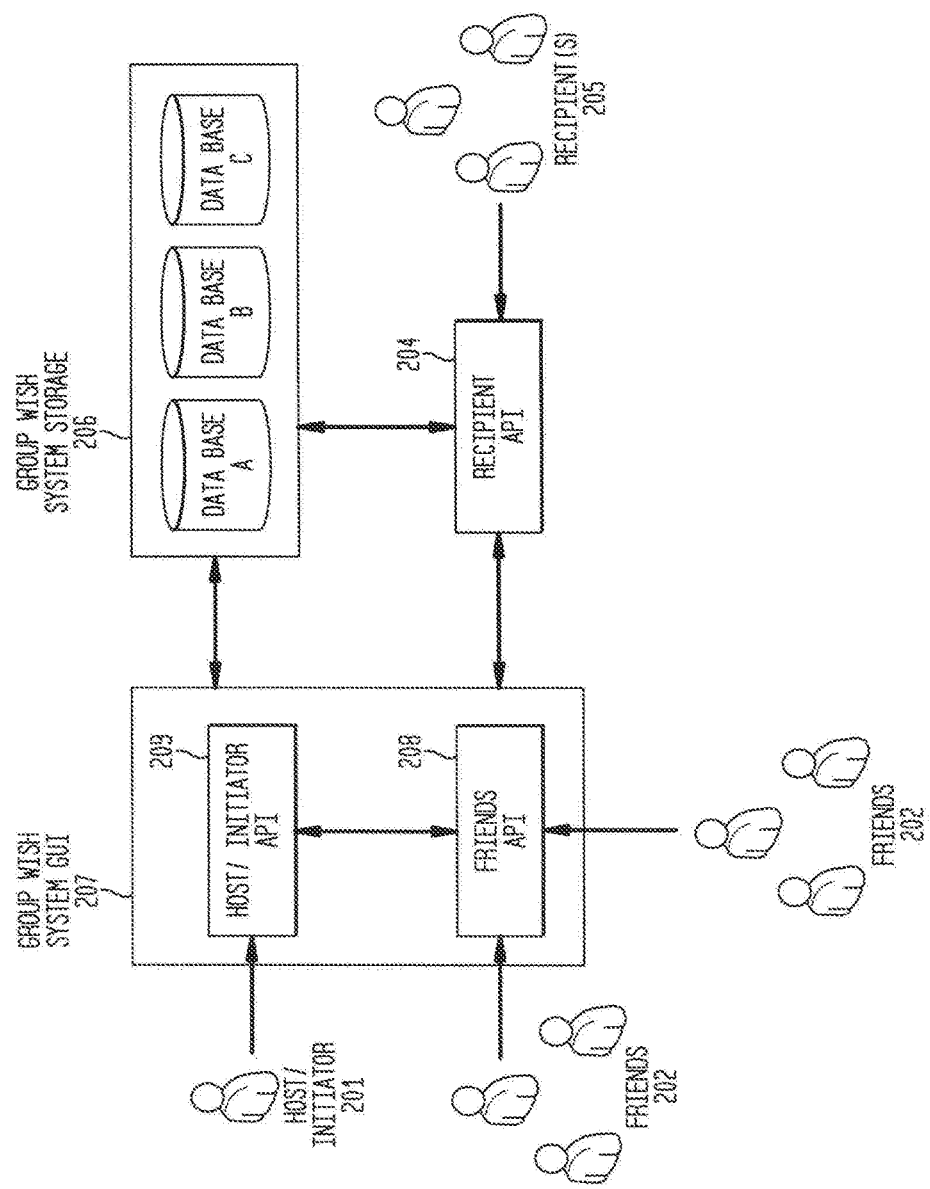
FIG. 2 depicts a high-level block diagram of an implementation according to the system of FIG. 1.

FIG. 2 depicts a high-level block diagram of an implementation according to the system of FIG. 1.

In one embodiment, group wish networking system 200 comprises a group wish networking graphical user interface (GUI) 207, system storage 206. GUI 207 is used for initial intake and interaction with the different users. In one embodiment, group wish system GUI 207 is used for all greeting templates. In other embodiment, group wish system GUI 207 is customized for a particular template. For example, the template drag and drop feature enables a user to custom build a particular template.

The Group Wish networking GUI 207 comprises a host/initiator API 209 and a friends API 208 and recipients API 204. In one embodiment, host/initiator API 209 and friends API 208 comprise the same interface. In other embodiments one interface accommodates the APIs.

Data associated with users group system 200 such as demographics, birthday, gender, school attended, interaction data are stored in group wish system storage 206. This database is also used for authentication purposes. Content associated with users such as messages, queued messages (e.g., email), text and SMS (short message service) messages, comment messages, messages sent using any suitable messaging technique, an HTTP link, HTML files, images, videos, audio clips, documents, document edits, calendar entries, events and other related files. Content items may be anything a user may upload, edit or interact with. In one embodiment, only one database is used. In other embodiments, multiple data bases are used.

Figure 3:
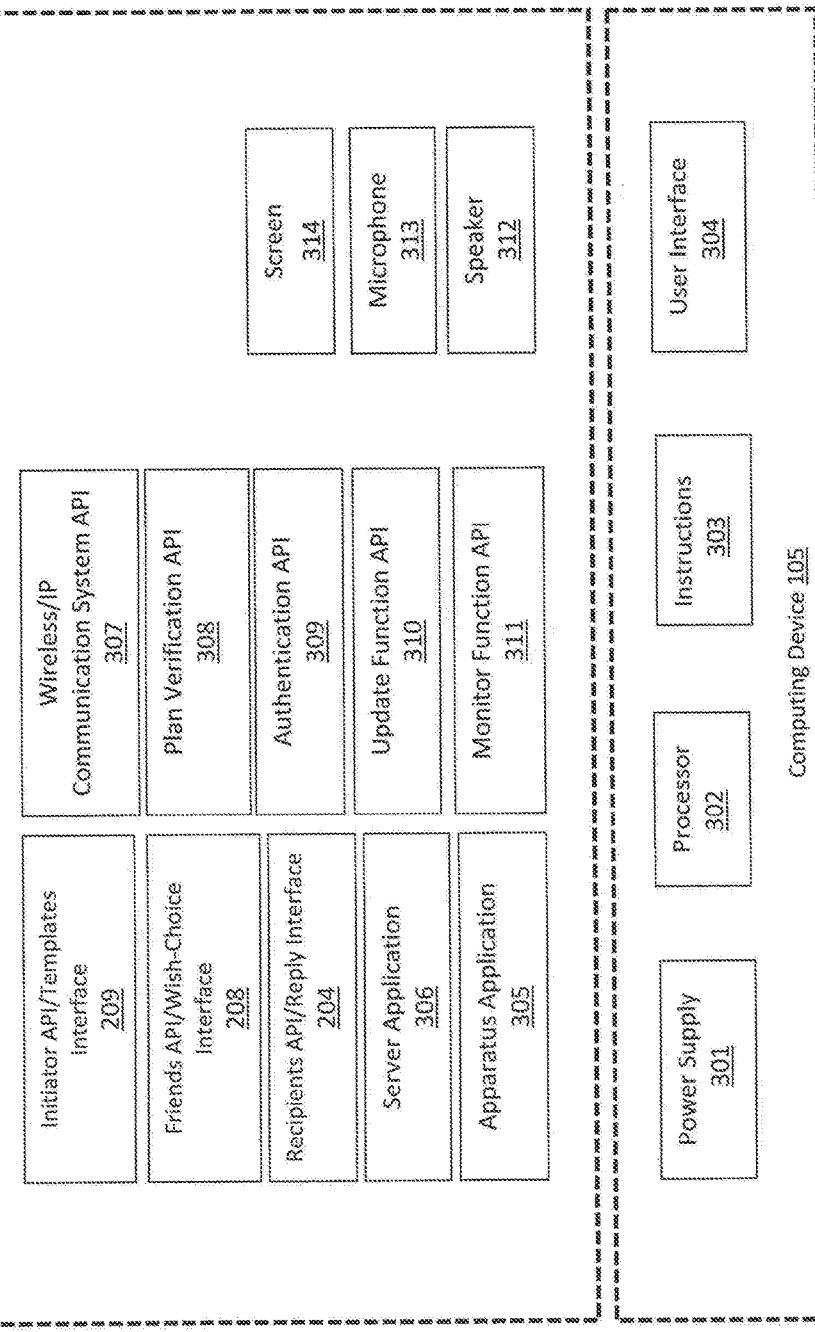
FIG. 3 depicts an exemplary computing device suitable for use in the system depicted in FIG. 1.

FIG. 3 depicts an exemplary computing device suitable for use in the system depicted in FIG. 1. Computing device 105 may include power supplies 301, a processor 302, and a memory 303 for storing instructions and the like, a user interface 304. Power supply 301 provides power to computing device 105. As such, the power supply may include, for example backup batteries. Other power supply configurations are possible as well. Processor 302 included in computing devices 105 may comprise one or more general-purpose processors and/or one or more special-purpose processors (e.g., image processor, digital signal processor, vector processor, etc.). To the extent that computing device 105 includes more than one processor, such processors could work separately or in combination. Computing device 105 may be configured to control functions of system 100 based on input received from one or more clients via user interface 304, for example.

Memory 303 may comprise one or more volatile and/or nonvolatile storage components such as optical, magnetic, and/or organic storage and memory 303 may be integrated in whole or in part with computing device 105. Memory 303 may contain instructions applications programming interface, configuration data) executed by processor 302 in performing various functions of system 100, including any of the functions or methods described herein. Memory 303 may further include instructions executable by processor 302 to control and/or communicate with the additional components.

Peripherals may include speaker 314, microphone 313 and screen 316. Speaker 314 may be configured to output audio to the user of system 100. Similarly microphone 315 may be configured to receive audio from a user of system 100. Screen 316 may comprise one or more devices used for displaying information to the user of computing device 105. Screen 316 may comprise a touchscreen used by a user to input commands to computing device 105. As such, a touchscreen may be configured to sense at least one of a position in the movement of a user's finger via capacitive sensing, or a surface acoustic wave process among other possibilities. Generally, a touchscreen may be capable of sensing finger movement in a direction parallel or perpendicular to the touchscreen surface of both, and may also be capable of sensing a level of pressure applied to the touchscreen surface. A touchscreen comes in different shapes and forms.

Computing device 105 may include one or more elements in addition to or instead of those shown.

System 100 is developed mainly on two platforms namely, apparatus application 305 and server application 306. Apparatus application 305 is developed using JAVA and Eclipse as SDK (Software Development Kit). Server application 306 is developed using PHP language and MySQL as data base. Languages equivalent to JAVA and Eclipse, PHP and MySQL may be used to build. Apparatus application 305 and Server application 306. Various APIs (307, 308 309, 310, 204, 208, 209) are used for the various functions of system 100. These APIs are also used in various embodiments for transferring data from Server application 306 to Apparatus application 305. In one embodiment, Stupeflix/Magisto is used. Although depicted and described with respect to the aforementioned APIs, it will be appreciated by those skilled in the art that other APIs having similar functionality are considered to be within the scope of the present embodiments.

In one embodiment, APIs (308, 309, 310) are used for passing Email and password parameters from Apparatus application 305 to Server application 306 and used Lo validate the login of the user.

In one embodiment, APIs (307, 308, 309, 310) transfer Email parameters from Apparatus application 305 to Server application 306 and new password is sent to users email.

Generally speaking, apparatus 105 include any Internet enabled device such as personal digital assistant (PDA), laptop, desktop, electronic book, tablets and the like capable of accessing the Internet may implement the various embodiments described herein. While apparatus 105 is generally discussed within the context of the description, the use of any device having similar functionality is considered to be within the scope of the present embodiments.

Although depicted and described with respect to an embodiment in which each of the APIs, engines, databases, and tools is stored within memory 303, it will be appreciated by those skilled in the art that the APIs, engines, database, and/or tools may be stored in one or more other storage devices internal to computing device 105.

The APIs, engines and tools may be activated in any suitable manner. In one embodiment, for example, the APIs, engines and tools may be activated in response to manual requests initiated by a user, in response to automated requests initiated by computing device 105, or other devices and the like, as well as various combinations thereof. For example, where an engine or tool is activated automatically, the engine or tool may be activated in response scheduled requests, in response to requests initiated by computing device 105 based on processing performed at computing device 105.

Figure 4:
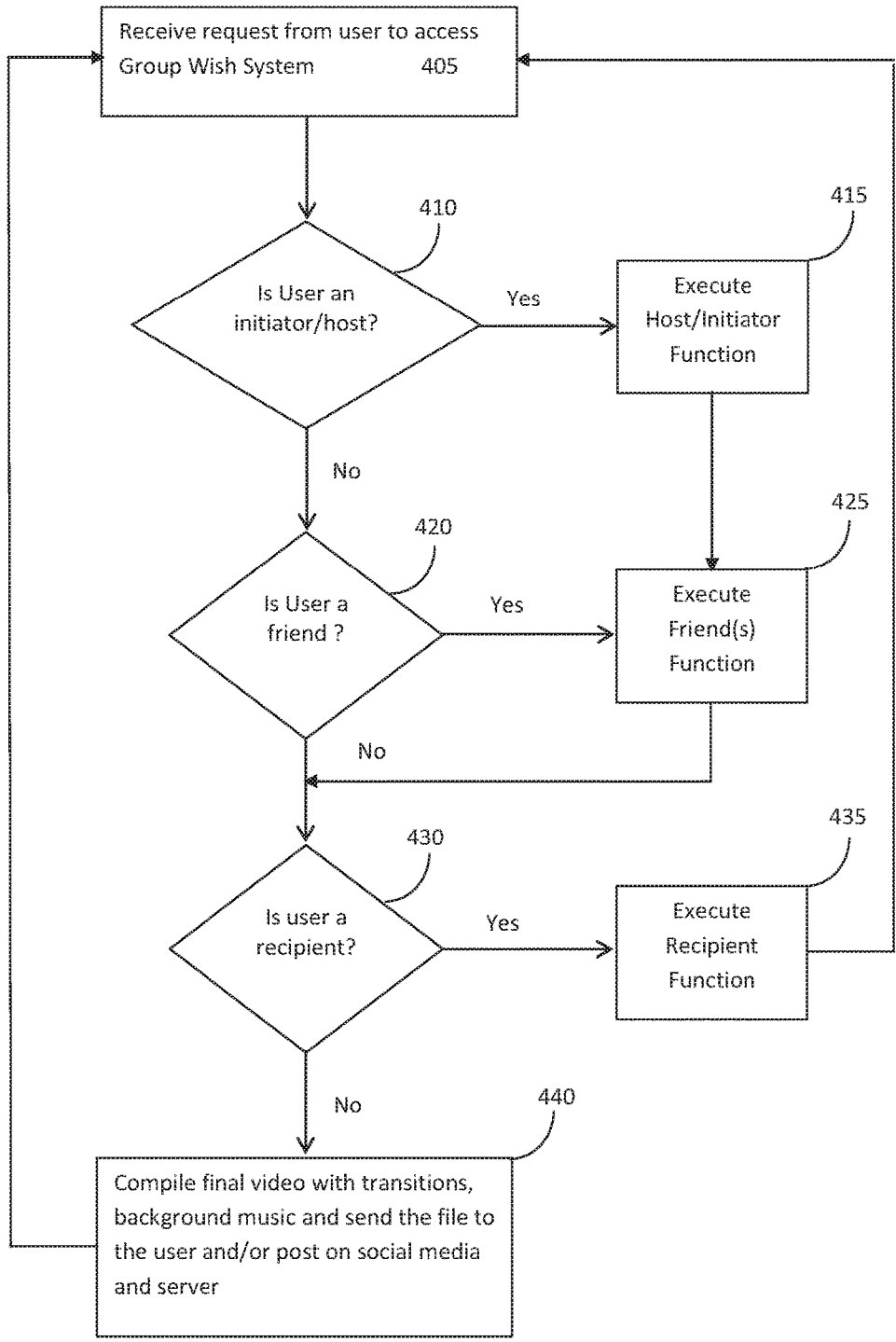
FIG. 4 depicts a Flow Chart of a process for implementing the algorithm according to an embodiment of the invention.

FIG. 4 depicts a Flow Chart of a process for implementing the algorithm according to an embodiment of the invention.

Various embodiments operate to provide a flexible tool that can be tuned to achieve some of the above outlined objectives without sacrificing others. For example, Group Wish provides an infrastructure for a group of friends or family (initiator/host) to share greeting card or express and communicate wishes (emotional, feelings) in commemoration of birthdays, anniversaries, holidays, weddings, reunions, demands, protests, opinion surveys, statistical purposes, complaints or any celebration to one or more individuals. The system can be used by officials, relatives and may be used as a marketing tool. Wishes from sponsors are added to the greeting card at the beginning, middle or end of the card. For example, a college or university can provide sponsorship messages to the added to the card.

At step 405, a user accesses the system. At step 410, the user is identified and authenticated. If the user is an initiator or host then step 415 is executed otherwise step 420 is executed. In one embodiment, the initiator function allows for one or more co-initiators.

At step 415, the initiator/host function is executed. The initiator is queried to ascertain if the session is for a new recipient or modification, of an existing greeting card. For a modification, the modification sub-function is executed. The modification sub-function implements the initiator's requests consistent with the features with the features of the initiator/host function.

For a new greeting card, the new card sub-function is executed. The initiator or host initiates the process by triggering a notification embedded with a link to the template based on a specific occasion. In one embodiment, the notification is a push notification. In other embodiments, the notification is a text message, a social media invite. Although primarily described herein with respect to the above notifications, other types of notifications as known to an artisan of ordinary skill in the art may be used. The templates are loaded onto a server equipped with built-in background music and transitions. In one embodiment, the transitions include video and text. In other embodiments, the transitions include either video or text. Yet in other embodiments, the transitions include celebrity voices.

The template function features a drag and drop option, which enables a user to custom build the template, which has a unique ID and a plurality of slots. A number of slots are associated with the template to thereby constitute a group message that is proportionate to the number of friends selected. In one embodiment, the number of slots is limited to fifteen (15). In other embodiments, the initiator selects the number of slots.

The initiator selects the theme including a title, types up general greetings then invites all common friends and sets the deadline to finish with process. The theme can be customized or selected from a. list of options including themes produced by artists or computer generated. Each invitee adds note, voice message, photo and the like. The initiator adds the final touch and then shares the "greeting card" with the recipient who then sends a thank you note to the senders.

Video message from each friend is inserted in a corresponding slot. In one embodiment, the recording or the video message is 3D-Holographic and the final output rendering is also 3D-Holographic such that the recipient can enjoy 3D-Holographic viewing experience. In other embodiments, the video recording is produced with no added feature. In other embodiments, one or more pre-made templates are Virtual Reality episode of each of the categories (birthday cake cutting. As such, recipient can experience cake cutting when viewed with VR gear thereby further enhancing the 3D-Holographic experience. Each individual slot of the group message or template will be displayed to the invited friends. The initiator will receive a notification message once the slots are filled in or the deadline (date) expires, whichever comes first. The initiator has the ability to change the default music and incorporate different background music. The initiator also has the ability to rearrange the video slots sent by the plurality of friends. In one embodiment, the initiator decides the selection with the highest votes. The initiator can also override a popular selection. In other embodiments, initiator/host function detects the type or message from the selection or title by the initiator and randomly adds sponsor greeting from a pool of sponsors in the database and celebrity voices, greeting and wish. This process is also performed on all other videos by participants prior to stitching in any slot.

As indicated above, when the user is a friend step 420 is executed. Otherwise step 430 is executed.

At step 420, the friend function is executed. The user is identified and authenticated. The same template (with unique ID) and designated slot will be displayed to all the friends invited. Video message from each friend is inserted in the corresponding slot. The slots are not assigned; however, as each invitee sends their portion, all videos are shuffled in the order received before stitching to combine the videos. In one embodiment, all videos are added in the order received before stitching to combine the videos. In other embodiments a corresponding slot is dedicated. In yet other embodiments, friends are able to select messages that use celebrity voices. For example, a friend may choose the favorite, celebrity voice. In other embodiments, tag lines from ads, news, shows are used to add humor, photos taken together with the recipient, notes, voice messages, videos and the like are added. In yet other embodiments, a friend can upload personal recording of a greeting. At the end of the process, the friend gets to vote on the selections made by the group.

At step 430, the user is identified and authenticated. The recipient function at step 435 is executed if the user is a recipient, otherwise step 440 is executed. The recipient is sent a notification embedded with a link to the final greeting card file. In one embodiment, the notification is a push notification. In other embodiments, the notification is a text message, a social media invite. Although primarily described herein with respect to the above notifications, other types of notifications as known to an artisan of ordinary skill in the art may be used. Once the recipient has had an opportunity to peruse the greeting card, a timer is set for a time period to remind the recipient to send a "thank you" note. In one embodiment, the initiator sets the time period. The recipient can modify the time period set by the initiator. In other embodiments, the recipient sets the time period, which may not be altered by anyone. In other embodiments, the time period is a default time period. The process returns to step 405 awaiting the next user.

At step 440, the final version of the greeting card is produced. The final video with transitions, background music is compiled. The greeting card is ready and available to be viewed by the recipient. If the initiator so indicated, the greeting is posted on social media. The process returns to step 405 awaiting the next user.

Although primarily depicted and described herein with respect to the embodiments described herein, it will be appreciated that the algorithm may be used in other embodiments.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed a computer processor for performing any or all of the steps, operations, or processes described.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore 65 intended that the scope of the invention be limited not this detailed description, but rather by any claims that issue on an application based hereon.

Although various embodiments which incorporate the teachings of the present invention have been shown and described in detail herein, those skilled in the art can readily devise many other varied embodiments that still incorporate these teachings.

I claim:
1. A computer-implemented method comprising:
   accessing a group wish social networking system associated with a plurality of users including an initiator, one or more recipients and a plurality of friends;
   triggering by the initiator a notification embedded with a link to a plurality of host based templates associated with a specific occasion connected with the one or more respective recipients;
   selecting a subset of templates to present to a chosen subset of the plurality of friends, the selected subset of templates containing background music and transitions to thereby build one or more custom templates each having a unique ID and a plurality of corresponding slots associated with each template thereby constituting a group message proportionate to the number of friends selected;
   propagating toward the plurality of selected friends the group message with a corresponding time-stamp, the group message containing the one or more custom templates and instruction directing the plurality of selected friends to choose a threshold number of custom templates;
   receiving, by a processor, the one or more custom templates having received a highest number of votes; and
   notifying the initiator once a specific condition is fulfilled.
2. The computer-implemented method of claim 1, further comprising:
   compiling one or more databases associated with the plurality of users including location coordinates of said users, wherein said plurality of users are subdivided into initiator, one or more recipients associated with a specific event and a plurality of friends forming a group;
   updating one or more corresponding databases as one or more new users join the group wish social networking system;
   indexing one or more databases of default templates containing background music and transitions;
   rendering one or more custom templates containing background music and transitions selected by the initiator;
   determining a composite of default and custom templates selected by the initiator to compose the group message; and
   propagating towards the server, in response to a request a plurality of data points,
   wherein the plurality of data points are associated with the group message.
3. The computer-implemented method of claim 1, wherein the group wish social networking system comprises for profit and non-profit organizations, associations, corporations, governmental and quasi-governmental agencies.
4. The computer-implemented method of claim 1, wherein the transitions comprise one of: video, text and voice message including celebrity voice, tag lines from ads, news, shows, personal recording.
5. The computer-implemented method of claim 1, wherein the plurality of users include a co-initiator, one or more sponsors, one or more co-sponsors, one or more recipients.
6. The computer-implemented method of claim 1, wherein a video message from each friend is inserted in a corresponding slot.
7. The computer-implemented method of claim 6, wherein recording of video message comprises 3D/Holographic recording technique.
8. The computer-implemented method of claim 7, wherein final output rendering of the video message comprises virtual reality technique to thereby enable the one or more recipients to experience virtual reality (VR) using VR gear.
9. The computer-implemented method of claim 1, wherein the specific condition comprises one of: all the slots being filled or a deadline set by the initiator expires.
10. The computer-implemented method of claim 1, wherein the initiator has the ability to rearrange the video slots sent by the plurality of friends in one of: particular order, shuffle.
11. The computer-implemented method of claim 1, wherein the initiator has the ability to replace a default background music with a different song.
12. The computer-implemented method of claim 1, wherein a final content containing the final video with transitions and background music is rendered and propagated toward the one or more recipients.
13. The computer-implemented method of claim 12, wherein the final content is posted on the networking system.
14. The computer-implemented method of claim 1, wherein a response by the one or more recipients is propagated toward the plurality of friends.
15. The computer-implemented method of claim 14, wherein the specific occasion comprises personal, religious and secular events and the response comprises a "thank you" note.
16. The computer-implemented method of claim 1, wherein a drag and drop feature is incorporated in the custom template building function.
17. A system comprising:
   at least one computing device communicatively coupled to at least one apparatus;
   a non-transitory computer readable medium having stored thereon instructions that, upon execution by the at least one computing device, cause the computing device to perform the steps comprising:
   accessing a group wish social networking system associated with a plurality of users comprising an initiator, one or more recipients and a plurality of friends;

triggering by the initiator a notification embedded with a link to a plurality of host based templates associated with a specific occasion connected with the one or more respective recipients;

selecting a subset of templates to present to a chosen subset of the plurality of friends, the selected subset of templates containing background music and transitions to thereby build one or more custom templates each having a unique ID and a plurality of slots associated with each template thereby constituting a group message proportionate to the number of friends selected;

propagating toward the plurality of selected friends the group message with a corresponding time-stamp, the group message containing the one or more custom templates and instruction directing the plurality of selected friends to select, a threshold number of custom templates;

receiving, by a processor, the one or more custom templates having received a highest number of votes; and notifying the initiator once a specific condition is fulfilled; and one or more processors communicatively coupled to the computing device.

18. The system of claim. 17, wherein the at least one computing device comprises a server or host communicatively coupled to the cloud, said server propagates configuration data towards the at least one apparatus, thereby enabling said at least one apparatus to interact with the plurality of users to exchange a plurality of data points with the at least one computing device for use in computing the group message.

19. The system of claim 18, wherein the cloud comprises a social network, a virtual private network (VPN), a wide area network (WAN) a local area network (LAN), corporate LAN, the Internet, satellite communication network, cellular network.

20. The system of claim 17, wherein the at least one computing device further comprises:

a non-transitory computer readable medium having stored thereon instructions that, upon execution by the at least one computing device, cause the at least one computing device to perform functions comprising:

compiling one or more databases associated with one or more users including location coordinates of said users, wherein said one or more users are subdivided into initiator, one or more recipients associated with a specific event and a plurality of friends forming a group;

updating one or more corresponding databases as one or more new users join the group wish social networking system;

indexing one or more databases of default templates containing background music and transitions;

rendering one or more custom templates containing background music and transitions selected by the initiator;

determining a composite of default and custom templates selected by the initiator to compose the group message; and propagating towards the server, in response to a request a plurality of data points, wherein the plurality of data points are associated with the group message.

* * * * *